United States Patent [19]

Witcraft

[11] 4,103,573

[45] Aug. 1, 1978

[54] BRAKING SYSTEM FOR ROLL-CUTTING KNIFE

[75] Inventor: Richard L. Witcraft, Park Ridge, Ill.

[73] Assignee: Unipat Corporation of America II, Harwood Heights, Ill.

[21] Appl. No.: 833,551

[22] Filed: Sep. 15, 1977

[51] Int. Cl.² .......... B23B 3/04; B23B 7/00

[52] U.S. Cl. .......... 82/93; 82/48; 82/101

[58] Field of Search .......... 82/92, 93, 94, 95, 96, 82/97, 98, 48, 100, 101

[56] References Cited

U.S. PATENT DOCUMENTS

| | | | |
|---|---|---|---|
| 1,504,703 | 8/1924 | Nicholas | 82/100 |
| 2,521,385 | 9/1950 | Marion | 82/93 |
| 3,748,934 | 7/1973 | Lezberg | 82/48 |
| 3,861,253 | 1/1975 | Witcraft et al. | 82/48 |
| 3,933,063 | 1/1976 | Stoffels | 82/92 |

*Primary Examiner*—Harrison L. Hinson
*Attorney, Agent, or Firm*—Michael G. Berkman

[57] ABSTRACT

In apparatus for converting tape roll stock into narrower roll segments, and which includes a rotatable cutting blade and means for automatically advancing the blade to engage and cut a revolving roll of tape and means for retracting the blade between sequential cutting operations in a repetitive process, a clutch mechanism for locking the blade on its shaft against rotation during initiation of entry of the blade into the roll stock, thereby to avoid adverse effects such as nicking and double cutting due to lateral runout of the cutting blade edge during blade rotation.

5 Claims, 4 Drawing Figures

BRAKING SYSTEM FOR ROLL-CUTTING KNIFE

BACKGROUND OF THE INVENTION

The present invention relates generally to tape slitting machines of the type used for converting roll stock such as paper, plastic and cloth into smaller roll segments to provide roll strips or tapes. More particularly, the present invention is directed to a machine of the type in which the roll stock is rotated and a circular blade or cutting knife is presented radially toward the roll to penetrate the roll and to sever a segmental section therefrom. The process is repetitive so that the original roll is converted, stepwise, into a plurality of smaller rolls or roll segments.

A machine of the type in which the present invention finds utility is described in Witcraft et al U.S. Pat. No. 3,861,253, and the disclosure of that patent is incorporated herein by reference to the extent that it is not inconsistent herewith.

General procecures for cutting incremental sections from a larger roll to provide smaller segments are known in the art. Typically, the roll stock is rotated on a supporting mandrel and a freely revolving round blade or cutting knife carried on a shaft is presented radially toward to engage the roll, thereby to penetrate and cut and to sever a predetermined segmental width. When contact is made between the revolving roll of tape and the rotatable blade, the blade or knife itself is caused to rotate on its shaft. This blade rotation poses problems.

During such rotation, the blade is subject to "lateral run-out". That is, there is lateral shifting or displacement of the blade edge along a rotational axis of the revolving blade. As a result, the path of the cutting edge of the rotating blade is not limited to a single locus or plane. The blade edge oscillates laterally. Moreover, the roll to be cut does not have a "perfect" circle peripheral circumference. Nor does the cutting blade.

The overall effect of the "imperfect" physical structures described is that the edge of the cutting blade tends to engage the rotating roll stock, not in a single encircling path, but in a plurality of closely spaced but different cutting engagements, at least until the blade penetrates sufficiently into the roll stock to establish a stabilized condition in which the blade cuts through along a single radial path. The initial laterally displaced contacts cause nicking and multiple cutting. It will be appreciated that roll segments in which the marginal edge portions include multiple or secondary cuts cannot be unwound in use without break-off and other practical difficulties.

It is, therefore, a principal aim of the present invention to provide a simple yet highly effective apparatus and cutting technique whereby firm and positive single locus engagement is ensured between the cutting blade and the roll stock so as to obviate nicking, double cutting, and other deleterious effects of lateral shifting or run-out of the cutting blade during initiation of the cutting operation.

SUMMARY OF THE INVENTION

The present invention provides an important improvement in the method of cutting a segmental section from a roll of stock whereby the adverse effects of multiple, laterally-spaced initiating cutting contacts between the cutting blade and the roll stock are obviated.

It is an important feature of the invention that means are provided whereby any lateral shifting of the cutting edge of the blade is prevented during initial engagement of and penetration of the leading edge of the blade into the roll material to be cut.

It is a feature of the invention that the cutting blade is rotatable freely upon its axis during the major portion of the cutting operation but is fixed against rotation during the period of initial contact and entry of the blade into the roll.

In a preferred embodiment of the invention, the apparatus is provided with automatic means for controlling the cutting blade so that it is locked against rotation as the blade approaches to contact and enter the roll and is released automatically for free rotation during the principal cutting operation.

A practical feature of the improvement of the invention is that the apparatus involved is relatively simple and may be easily incorporated as a retro-fit improvement on existing machines.

In a specific preferred embodiment of the invention, locking of the cutting blade is effected by means of a clutch assembly controlled through a pressurized fluid, such as compressed air.

A related feature of the invention is that the means for locking and for releasing the cutting blade may be readily adjusted to accommodate different blade diameters as well as rolls having different diameters.

Other objects, features and advantages of the invention will become evident upon a reading of the following specification considered with the drawings.

DESCRIPTION OF THE PREFERRED EMBODIMENT

The aims and objects of the invention are achieved, in accordance with the invention, by providing a braking system for locking the roll-cutting blade against rotation during initial entry of the knife edge into the roll and by releasing the blade for free rotation during the subsequent, principal cutting operation.

Figure 1:
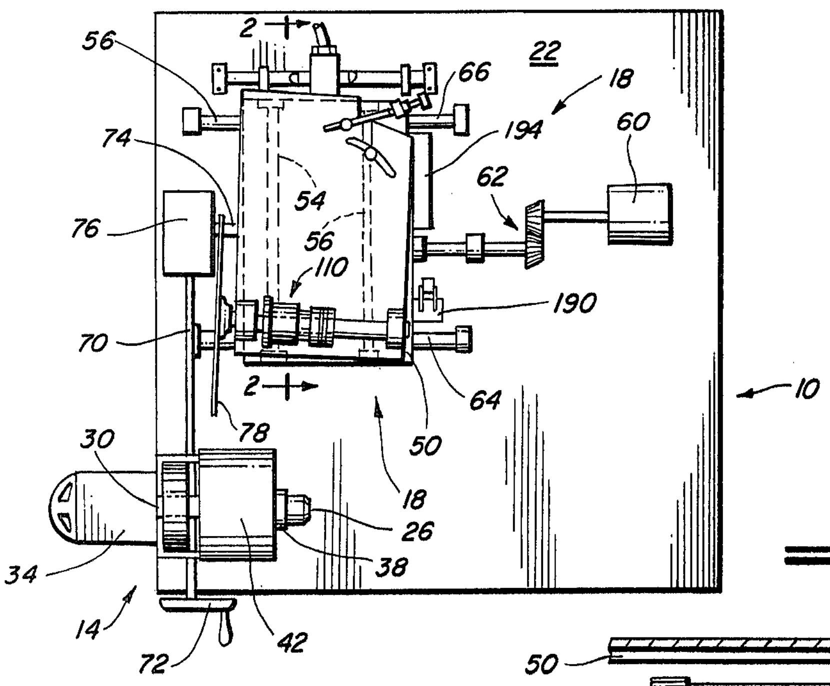
FIG. 1 is a top plan view of a roll cutting machine embodying the features of the present invention.
Figure 3:
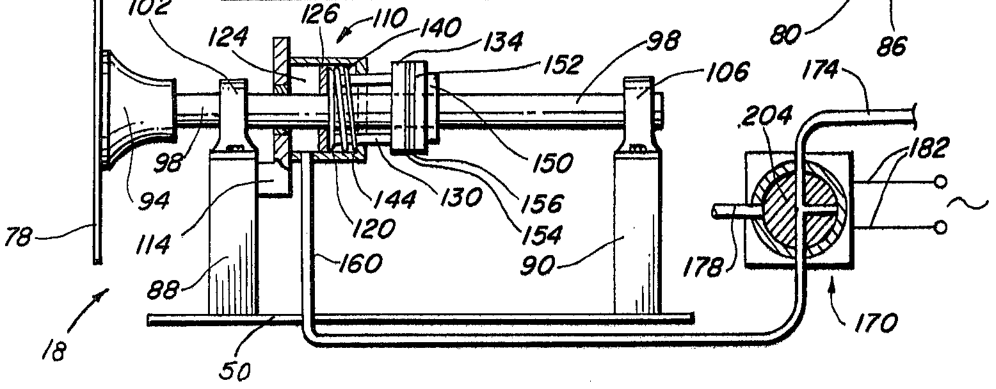
FIG. 3 is a front view, partly in section, of the cutting knife carriage assembly indicating schematically a clutch mechanism and its controls for locking the blade against rotation about its shaft, and for releasing the blade, according to the invention.

Referring now to the drawings, and particularly to FIGS. 1 and 3, there is shown, for the purpose of illustrative disclosure, a preferred embodiment of one form of the cutting blade braking system of the invention. As illustrated,, the roll-cutting machine 10 includes a tpae roll supporting and drive assembly 14, and a cutting knife and carriage assembly 18 supported on a floor plate 22.

A roll-supporting chuck or mandrel 26, generally cylindrical in form, is secured on a rotatable shaft 30 driven by an electrical motor 34. Mounted on the mandrel 26 is a coaxial sleeve 38 over which the roll of tape 42 is positioned and secured for cutting.

Figure 2:
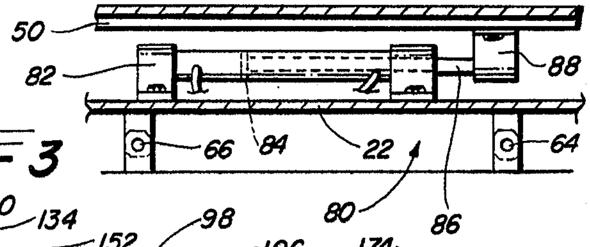
FIG. 2 is a cross sectional view taken substantially on the lines 2—2 of FIG. 1 and showing the means for shifting the knife carriage assembly forwardly and rearwardly.

The cutting knife and carriage assembly 18 includes means for shifting the knife blade laterally as well as for moving it forwardly and rearwardly for selective positioning with respect to the tape roll 42 preparatory to severing segmental sections therefrom. The means by which the knife carriage assembly 18 and the support table or base plate 50 upon which it is mounted are shifted includes a pair of parallel spaced forwardly and rearwardly extending base plate supporting rails or tracks 54 and 56. The floor plate is moved laterally by an electric motor 60 operating through a shaft and gear assembly 62. A second pair of parallel rails or tracks 64 and 66 running longitudinally of the floor plate erves as support means on which the plate 50 and the cutting knife and carriage assembly 18 may be shifted laterally. In the specific embodiment of the invention illustrated, there is provided a second, manual drive mechanism constituting a primary shaft 70 turned by means of a hand wheel 72 to rotate a secondary shaft 74 through a gear box 76 whereby the knife blade 78 may be positioned laterally. The means for effecting the shifting of the base plate 50 forwardly and rearwardly is achieved by means of a dual-acting piston and cylinder assembly 80 carried by and secured to the floor plate 22 and to the base plate 50. As shown in FIG. 2, the assembly 80 includes a cylinder 82, a piston 84, and a piston rod 86, the latter being fastened to a fixture 88 secured to the underside of the base plate 50. Delivery of pressurized fluid into the cylinder 82, at the appropriate side of the piston 84 causes the base plate 50 to move rearwardly or forwardly. The structure described forms no part of the present invention. Accordingly, no further discussion is deemed to be required. However, a complete description is found in Witcraft et al. U.S. Pat. No. 3,861,253, which description is incorporated herein by reference.

As shown in FIG. 3, the cutting knife and carriage assembly 18 is supported on a pair of posts or standards 88 and 90 fastened to the base plate 50. The cutting blade or knife 78 is mounted on a hub 94 which is in turn secured to a horizontally extending shaft 98.

The shaft 98 is rotatably supported in a pair of bearings in pillow blocks 102 and 106 mounted on the spaced standards 88 and 90. The shaft 98 is sleeved through a clutch assembly 110 which is fastened to the post 88 by means of an end flange 114. The clutch assembly 110 includes a cylinder 120 a cylinder chamber 124, and an annular piston 126. The piston 126 is connected to a tubular piston "rod" 130 fastened to a pressure plate 134 which encircles and is slidable on the knife support shaft 98. A spring 140 interposed between the end wall 144 of the housing 120 and the annular piston 126 acts to bias the pressure plate 134 to the left as shown in FIG. 3.

A collar 150, fixedly secured on the knife shaft 98 in proximity to the pressure plate 134, secures a second pressure plate 152 and the facing surfaces of the pressure plates 134 and 152 are provided with bonded clutch facings 154 and 156.

Figure 4:
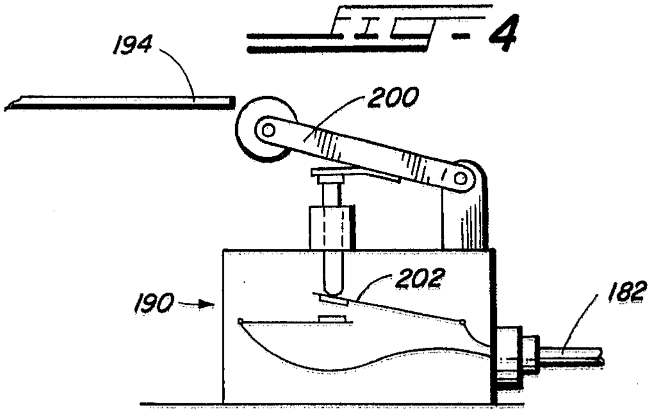
FIG. 4 is an elevational view indicating diagramatically the manner in which a microswitch is actuated to control the fluid pressure to the clutch mechanism for regulating the operation of the cutting knife.

A fluid conduit 160 is connected to and is in communication with the interior of the cylinder 124 to provide pressurized fluid from a pump (not shown). The end of the conduit 160 remote from the cylinder 124 is connected to a three-way valve 170 fed with compressed air through a line 174 from a compressor (not shown). The valve includes an air exhaust port 178 and is energized by means of electrical signals delivered through wires 182 upon actuation of a micro-switch 190 (FIG. 4).

The switch 190 is motivated through a contact bar or flange 194, carried on the base plate 50 and shiftable therewith. As the knife carriage assembly 18 moves forwardly to bring the edge of the cutting knife 78 into contact with the roll 42 to be segmented, the flange 194 engages and presses down upon a switch actuating lever 200 which acts in turn to press on the switch element 202, all as indicated schematically in FIG. 4. Downward pressure on the switch element 202 actuates the valve 170 shifting the valve core 204 clockwise one-fourth turn to connect the conduit 160 to the air exhaust line 178, to vent the cylinder chamber 124. The clutch elements 134 and 152 separate under action of the spring 140 and the knife-carrying shaft 98 is free to turn. Until the switch 190 is actuated, the pressurized air supplied through the line 174 to the valve 170 acts upon the piston 126 urging the piston to the right as viewed in FIG. 3 so that the clutch plate 134 bears against the cooperating plate 152 to lock the shaft 98 and the knife blade 78 carried thereby against rotation, as shown in FIG. 3. Any other suitable valving arrangement of clutch control mechanism may be used.

With the cutting blade 78 locked against rotation, the advancing movement of the carriage assembly 18 causes the blade edge to bear against and enter the rotating roll 42 carried on the spindle 26. The penetrated roll secures the cutting blade 78 against lateral deflection to ensure a single clean cut. When penetration of the blade into the roll has proceeded to a depth of about 1/32 inch to about ⅛ inch, the microswitch 190 is actuated by pressure of the flange 194 on the switch arm 200. The valve core 204 rotates clockwise ¼ turn whereby pressurized air supply is cut off from the supply line 174 and the pressure line 160 to the cylinder chamber 124 vents through the discharge line 178. The spring 140 in the clutch assembly 110 causes the clutch plate 134 to separate from the fixed plate 152 and the knife blade 78 and supporting shaft 98 are freely rotatable during completion of the cutting operation.

Retraction of the knife carrying assembly 18 from the roll 42 after severance of a segmental sector causes the flange 194 to runn off of the switch lever 200 whereby the switch 190 is de-energized and the valve core 204 shifts ¼ turn counterclockwise to the position shown in FIG. 3, to connect the air supply line 174 to the cylinder supply line 160 shifting the piston 126 and the pressure plate 134 carried thereby to the right (FIG. 3) to engage the pressure plate 152 fixed on the shaft 98, thereby to re-lock the cutting blade 78 on the support shaft 98.

While disclosures of preferred embodiments of the invention and preferred methods for fabricating the structural components of the invention have been provided, it will be apparent to those skilled in the art that numerous modifications, changes and variations can be made without departing from the essential spirit of the underlying principles of the invention. It is, therefore, desired by the following claims to include within the scope of the invention all such variations and modifications by which substantially the result of this invention may be obtained through the use of substantially the same or equivalent means.

I claim:

1. In a tape slitting machine including mandrel means and means rotatably supporting said mandrel means to turn a core wound roll of tape to be cut, blade means including a circular blade for slitting the roll of tape to provide a plurality of narrower roll strips, carriage means and drive means for moving said blade toward and from said roll of tape to cut therethrough a transform the roll of tape into a series of incremental roll strips, and means supporting said blade for rotation about a center thereof:

the improvement comprising clutch means for locking said blade against rotation upon entry of said blade edgewise radially into cuttingly to engage an annular peripheral margin of a roll of tape to be cut into incremental roll strips, and means to release said clutch means to allow free rotation of said blade upon engagement of said blade with and positive entry of a leading edge thereof into said roll of tape, to promote sustained, uninterrupted positive contact of said blade with said roll of tape and to minimize disruptive, detrimental, sporadic multiple engagement therebetween, thereby to obviate nicking and double cutting of the roll of tape.

2. The improvement as set forth in claim 1 and further comprising means automatically to re-energize said clutch to brake said blade against rotation upon completion of a segmental cut through said roll of tape and during retraction of said blade from the roll of tape preparatory to initiating sequential incremental cuts of the roll of tape.

3. The improvement as set forth in claim 2 and further comprising fluid-pressurizing means, fluid conduit means, and valve means for energizing and controlling operation of said clutch means.

4. The improvement as set forth in claim 3 and further comprising switch means, and switch actuating means, said switch actuating means comprising means responsive to movement of said blade along a path normal to an axis of the roll of tape and operable to act upon said switch means to effect energization and de-energization of said clutch means during shifting movement of said blade relative to the roll of tape.

5. The improvement as set forth in claim 1 wherein said clutch means operates to lock said blade against rotation until said blade has entered the roll of tape a radial distance in the range of from about 1/32 inch to about $\frac{1}{8}$ inch.

* * * * *